United States Patent
Liu

(10) Patent No.: US 9,428,930 B2
(45) Date of Patent: Aug. 30, 2016

(54) EASY FOLD LAYOUT HUNTING BLIND FRAMEWORK STRUCTURE

(71) Applicant: Cheh-Kang Liu, Taipei (TW)

(72) Inventor: Cheh-Kang Liu, Taipei (TW)

( * ) Notice: Subject to any disclaimer, the term of this patent is extended or adjusted under 35 U.S.C. 154(b) by 247 days.

(21) Appl. No.: 14/458,339

(22) Filed: Aug. 13, 2014

(65) Prior Publication Data

US 2016/0044912 A1    Feb. 18, 2016

(51) Int. Cl.
*E04H 15/48* (2006.01)
*A01M 31/00* (2006.01)
*E04H 15/00* (2006.01)
*A01M 31/02* (2006.01)

(52) U.S. Cl.
CPC .......... *E04H 15/001* (2013.01); *A01M 31/025* (2013.01); *E04H 15/48* (2013.01)

(58) Field of Classification Search
CPC ..... E04H 15/001; E04H 15/34; E04H 15/48; A01M 31/02; A01M 31/025
USPC .................. 135/901, 143, 151, 153, 154
See application file for complete search history.

(56) References Cited

U.S. PATENT DOCUMENTS

| | | | | |
|---|---|---|---|---|
| 2,975,792 A * | 3/1961 | Herbert | ............... | E04H 15/48 108/129 |
| 4,186,507 A * | 2/1980 | Stinnett | ............. | A01M 31/00 43/1 |
| 4,751,936 A * | 6/1988 | Zibble | ............. | A01M 31/025 135/117 |
| 5,647,159 A * | 7/1997 | Latschaw | ............. | E04H 15/001 135/157 |
| 5,762,085 A * | 6/1998 | Punch | ............. | E04H 15/001 135/115 |
| 6,698,131 B2 * | 3/2004 | Latschaw | ............. | A01M 31/025 43/1 |
| 7,549,434 B2 * | 6/2009 | Bean | ............. | E04H 15/001 135/143 |
| 8,381,750 B2 * | 2/2013 | Desouches | ............. | E04H 15/001 135/115 |
| 8,701,691 B2 * | 4/2014 | Hawk, III | ............. | A01M 31/025 135/143 |
| 8,936,036 B2 * | 1/2015 | Parsons | ............. | E04H 15/58 135/117 |
| 9,133,644 B1 * | 9/2015 | Liu | ............. | E04H 15/001 |
| D750,273 S * | 2/2016 | Kasprowicz | ............. | D25/16 |
| 9,279,268 B2 * | 3/2016 | Liu | ............. | E04H 15/48 |
| 9,303,424 B1 * | 4/2016 | Galloway | ............. | E04H 15/001 |
| 9,303,425 B1 * | 4/2016 | Galloway | ............. | E04H 15/001 |
| 2004/0231221 A1 * | 11/2004 | Latschaw | ............. | A01M 31/025 43/1 |
| 2007/0015638 A1 * | 1/2007 | Wu | ............. | A63B 21/026 482/121 |

FOREIGN PATENT DOCUMENTS

WO    WO 2011022764 A1 *   3/2011   ............. E04H 15/48
WO    WO 2011047430 A1 *   4/2011   ............. E04H 15/36

* cited by examiner

*Primary Examiner* — David R Dunn
*Assistant Examiner* — Danielle Jackson
(74) *Attorney, Agent, or Firm* — Jackson IPG PLLC; Demian K. Jackson

(57) ABSTRACT

An easy fold layout hunting blind framework structure comprises two upper supporting frames, a downwardly turning hinged joint control device, a front supporting frame, a rear supporting frame, and a front sustention stand which can be easily folded and developed for conveniently and rapidly usable in the hunting site.

4 Claims, 10 Drawing Sheets

US 9,428,930 B2

EASY FOLD LAYOUT HUNTING BLIND FRAMEWORK STRUCTURE

BACKGROUND OF THE INVENTION

1. Field of the Invention

The present invention relates to an easy fold layout hunting blind framework structure which can be easily folded and developed for conveniently and rapidly usable in the hunting site.

2. Description of the Related Art

Referring to FIG. 1, this is a hunting blind on whose framework there is attached a camouflaged cloth structure formed of machine sewing or binder hook bound. Such a structure is so complicated to handle because it has to employ a number of screw bolts 901 to engage the structure parts by aiming at their precise positions when developing for use at site. In Case removing to a new hunting site or folding to put away in the customary place, the tedious procedure of detaching a number of screw bolts 901 one by one must be repeated for folding up the structure. Besides, the structure is bulky and inconvenient to transport.

Referring to US Publication No. 2013/0291916, a structure of hunting blind is disclosed whose two upper supporting frames do not necessary to lock, but instead, both upper supporting frames require to be positioned on the outer cover cloth. In this way, the structure is not easy to be built up and relieved from the outer cover cloth when detaching, therefore it is not easy to carry when changing the hunting sites. Moreover, the entire structure is bulky and inconvenient to put away.

SUMMARY OF THE INVENTION

In view of the foregoing situation, the inventor of the present invention herein conducted intensive research with all his minds and heart and finally came out with an easy fold layout hunting blind framework structure.

Accordingly, it is a main object of the present invention to provide an easy fold layout hunting blind framework structure which can be easily and rapidly folded and developed.

It is another object of the present invention to provide an easy fold layout hunting blind framework structure which can be folded or developed easily and simply without applying any hand tools or detaching instruments.

It is still another object of the present invention to provide an easy fold layout hunting blind framework structure which will be compact in size after folding so as to be conveniently portable and removable to a new hunting site. Besides, it is convenient to put away and store for the user, and saving the production materials, easy for packing and transportation for the manufacturer.

It is one more object of the present invention to provide an easy fold layout hunting blind framework structure whose front sustaining stand is free to adjust its angle between the front supporting frame such that the hunter is able to conveniently utilize the device.

DETAILED DESCRIPTION OF THE INVENTION

Figure 1:
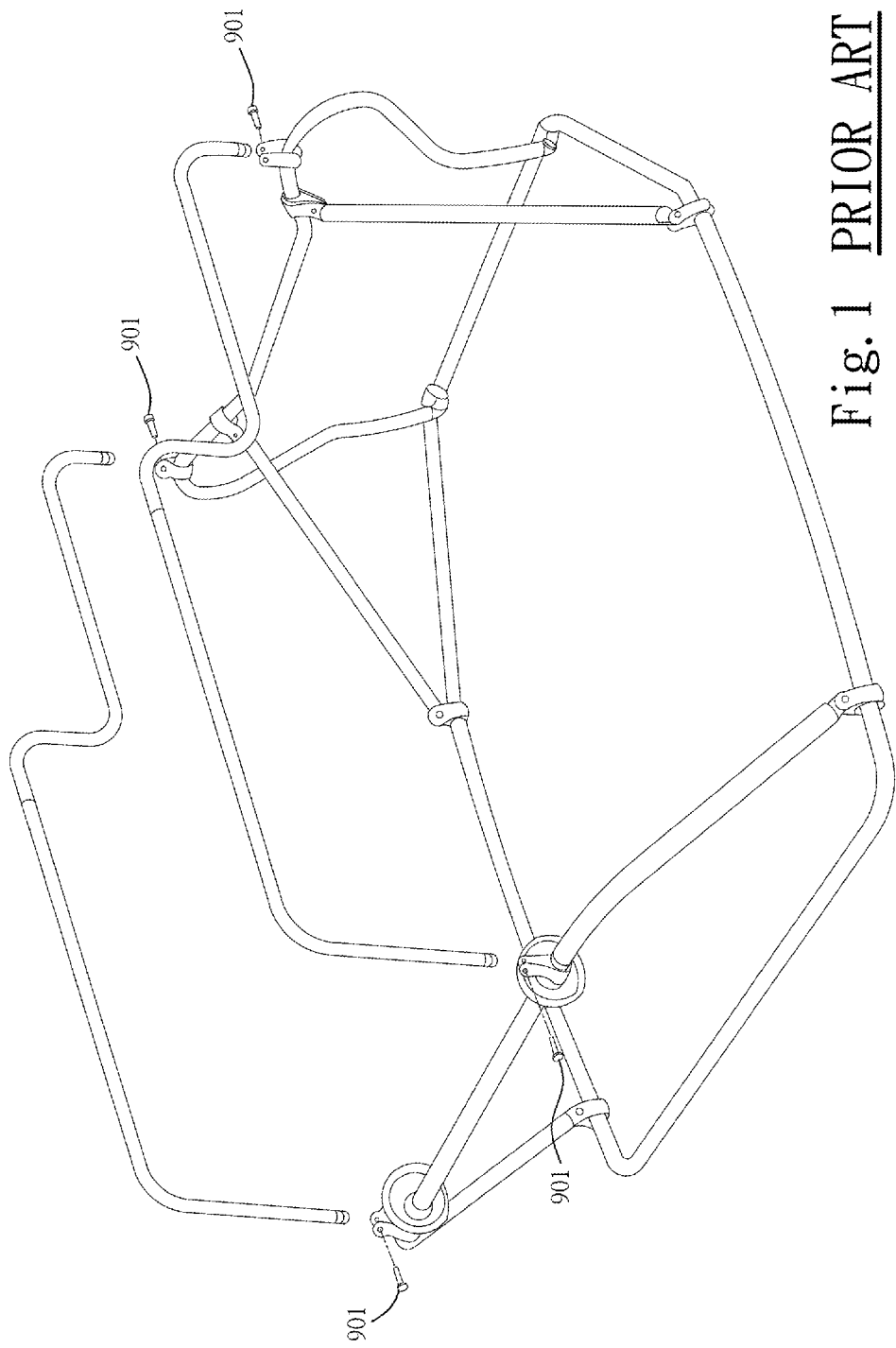
FIG. 1 is a three dimensional view of a conventional hunting blind framework structure.
Figure 2:
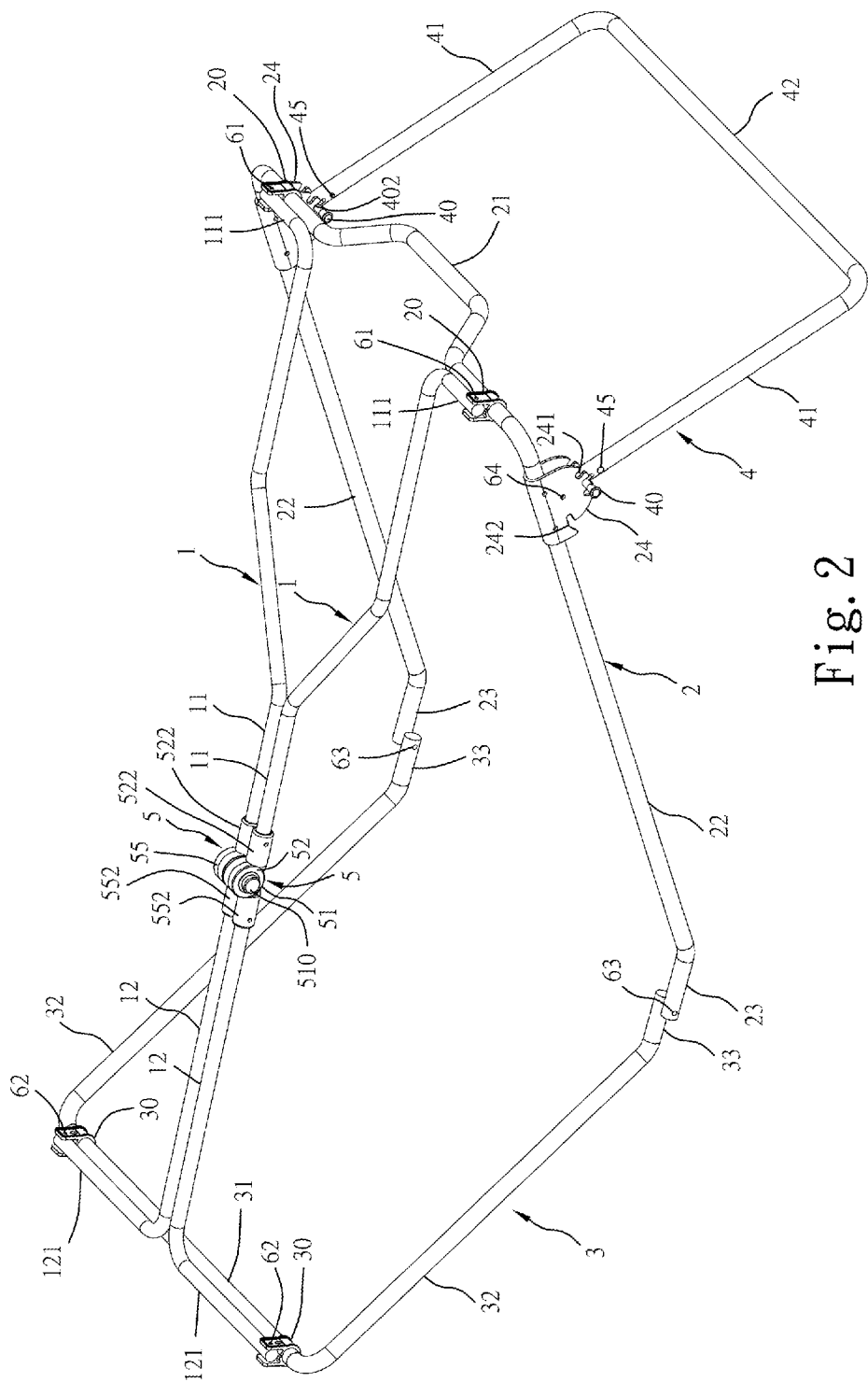
FIG. 2 is a three dimensional view of the structure according to an embodiment of the present invention.
Figure 3:
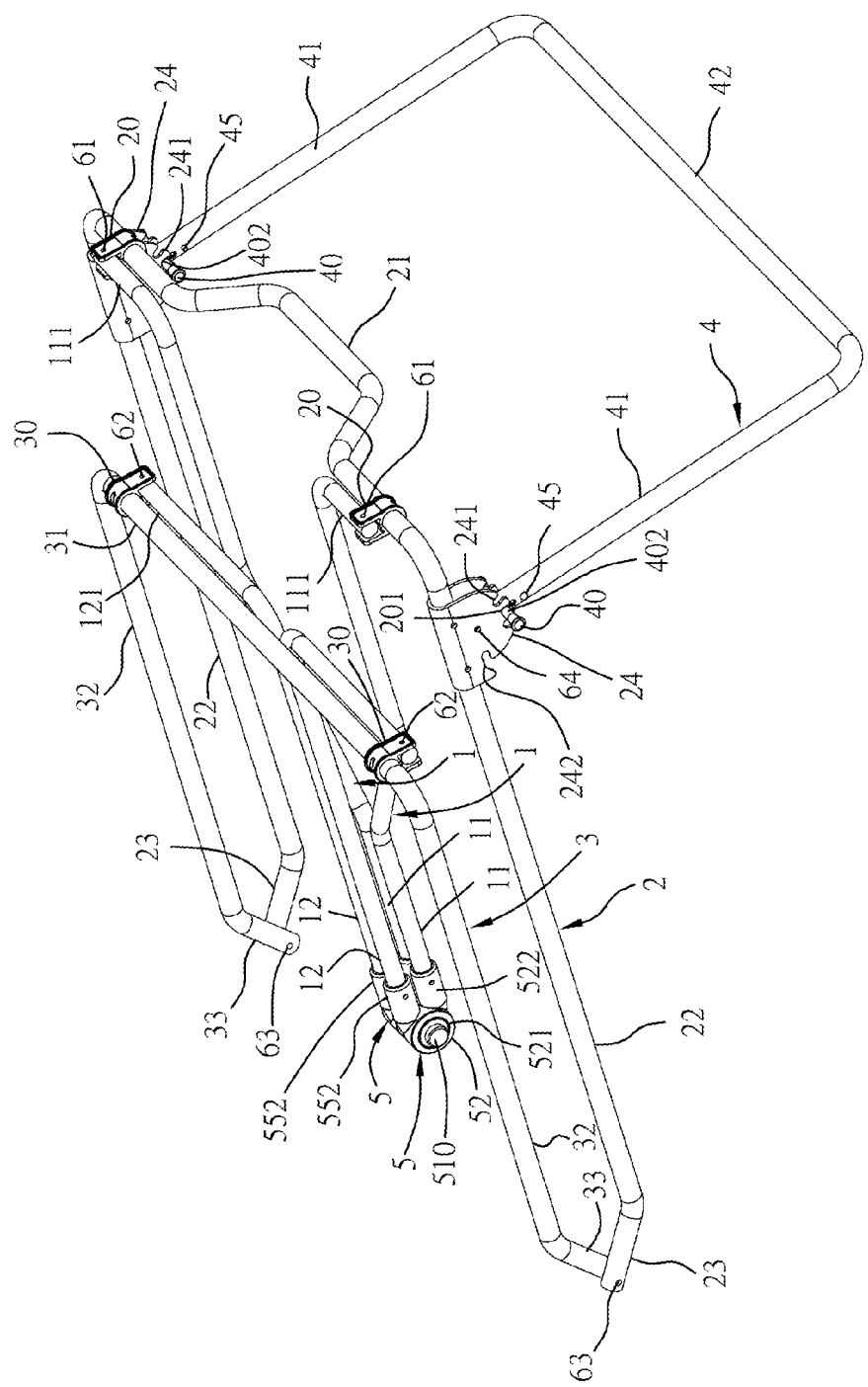
FIG. 3 is a schematic view according to an embodiment of the present invention showing the folding operation of the structure.
Figure 4:
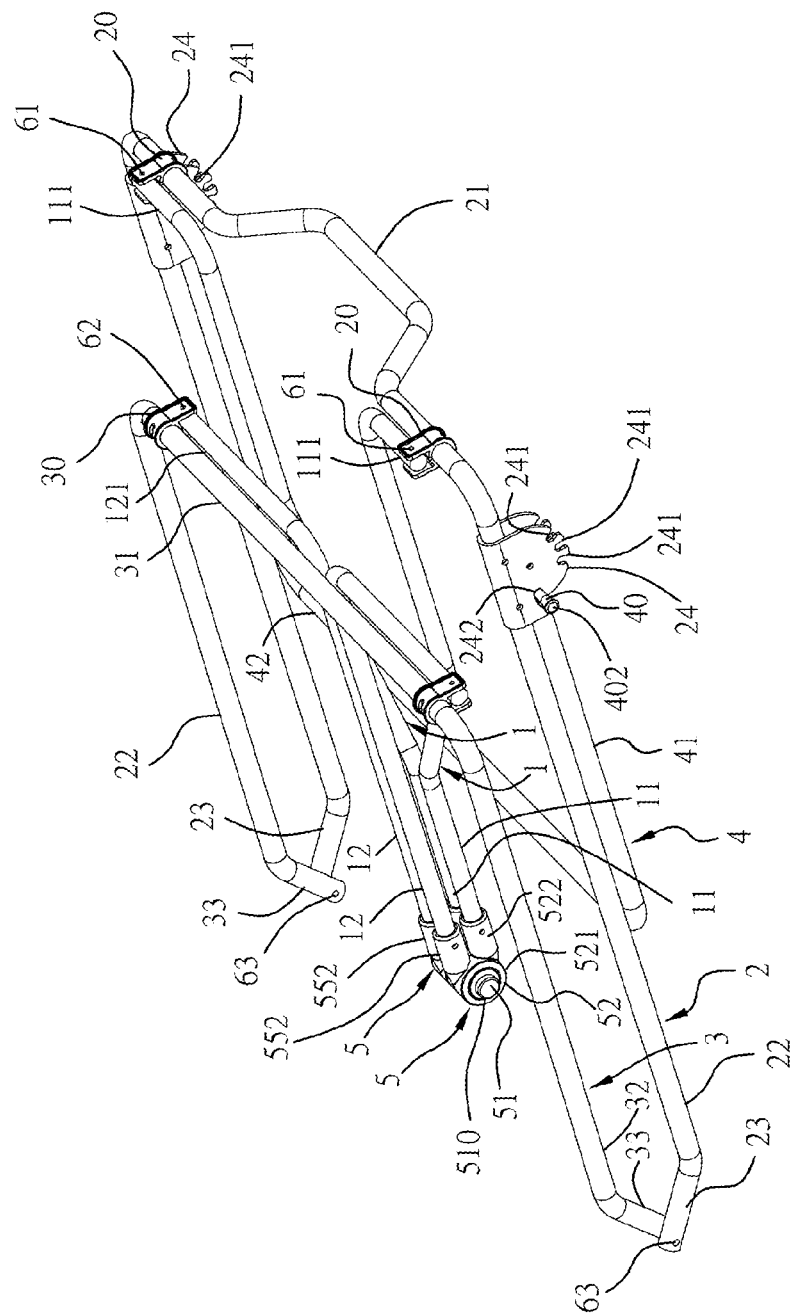
FIG. 4 is a three dimensional schematic view according to an embodiment of the present invention where the structure is in folded states.

Referring to FIGS. 2~13, the easy fold layout hunting blind framework structure of the preset invention is to be used for building up a camouflaged cloth structure for the duck hunter to hide. The structure comprises:

Two upper supporting frame 1 each further includes first supporting bars 11 and second supporting bars 12, each of the first supporting bars 11 is connected to a front side bar portion 111 with its front side, while each of the second supporting bars 12 is connected to a rear side bar portion 121 with its rear side, each of the first supporting bars are 11 and each of the second supporting bars 12 are in connection with each other via a downwardly turning hinged joint control device 5 so as to control the upper supporting frames 1 to develop (see FIG. 2) or fold by turning downwards about the hinged joint (see FIGS. 3, 4). Outer end of the front side bar portion 111 of each first supporting bar 11 is hinged to right and left sides of the front supporting bar 2, and the outer end of the rear side bar portion 121 of the second supporting bar 12 is respectively hinged to right and left sides of the rear supporting frame 3.

A front supporting frame 2 has an upper bar 21 connected to side bars 22 at two sides of the upper bar 21 and to two bottom bars 23 at lower part of the two side bars 22. A first hinged casing 20 is provided at both right and left sides of the front supporting frame 2's upper bar 21 so as to be hinged to outer ends of the front side bar portion 111 of each first supporting bar 11 of the two upper supporting frames 1 via a first shaft hinge 61. A set base 24 is respectively provided at the upper part of both side bars 22 of the front supporting frame 2 so as to make a hinge connection with a front sustention stand 4. The bottom bars 23 provided at two sides of the front supporting frame 2 are able to stand on the ground.

A rear supporting frame 3 has an upper bar 31 connected to side bars 32 at two sides of the upper bar 31 and two bottom bars 33 at lower part of the two side bars 32. A second hinged casing 30 is provided at both right and left sides of the rear supporting frame 3's upper bar 31 so as to be hinged to outer ends of the rear side bar portion 121 of each second supporting bar 12 of the two upper supporting frames 1 via a second shaft hinge 62. The bottom bars 23 provided at two sides of the rear supporting frame 3 are able to stand on the ground, and hinge their inner ends with inner ends of the bottom are 23 provided at two sides of the front supporting frame 2 together with a third shaft hinge 63.

The front sustention stand 4 includes two side bars 41 and two bottom bars 42 which are connected to lower parts of the two side bars 41. The upper parts of the front sustention stand 4's two side bars 41 are respectively hinged to two set bases 24 provided to two sides of the aforesaid front supporting frame 2 via a fourth shaft hinge 64, and at the upper part of the two side bars 41 there are respectively provided positioning devices 40 so as to be separably in connection with the two set bases 24 located at two sides of the aforesaid front supporting frame 2. On the other hand, the bottom bars 42 of the rear sustention stand 4 are used to stand on the ground.

Meanwhile, the upper part of each of aforesaid front sustention stand 4's two side bars 41 is formed into a hollow tube portion and there is a first spring 43 (see FIG. 13) in it. In the hollow tube portion there is equipped with a set member 45 (see FIGS. 2, 3, 13) and one end of the first spring 43 butts against the set member 45, while the other end thereof butts against a middle portion 401 (see FIG. 13) of the positioning device 40.

Two opposing ends 402 of the positioning device 40 respectively go through a slide slot 411 located at a position facing to the hollow tube portion. By so, it makes the positioning device 40 able to compress the first spring 43 and slide up and down in the slide slot 411. The set bases 24 which respectively provided on the front supporting frame 2's two side bars 22 are respectively have several positioning slots 241 (see FIG. 13) disposed in different angles such that the positioning device 40 provided at two side bars 41 of the front sustention stand 4 are free to select anyone of the positioning slots 241 between two set bases 24 provided to the front supporting frame 2 to detain the two ends 402 of the positioning device 40. When the positioning device 40 intends to change its detained place to another positioning slot 241 in different angle, the only thing to do is to apply a downward force to the positioning device 40 so as to compress the first spring 43 in turn, and remove the positioning device 40 downwards along the slide slot 411 thereby relieving the positioning device 40 from the old place and again selecting a new positioning slot 241 to be confined. In this way the inclined angle of the front sustention stand 4 can be adjusted.

Figure 13:
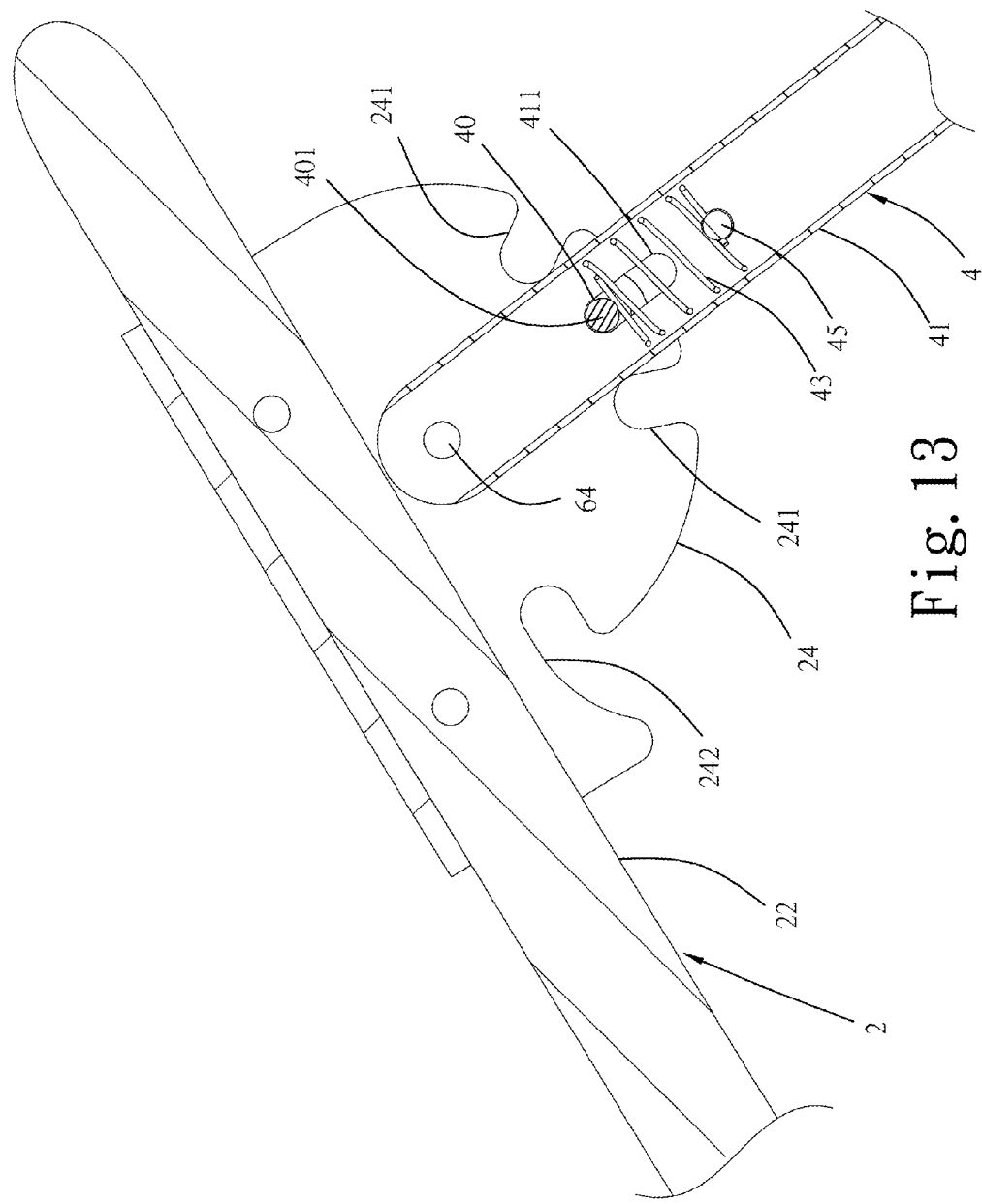
FIG. 13 is an enlarged partial sectional view according to an embodiment of the present invention showing the positioning device of the sustention stand is confined in one of the positioning slot formed in the set base.

Besides the two set bases 24 of the front supporting fame 2 may further have the function of a folding detention slot 242 (see FIGS. 2, 3, 13). After the front sustention stand 4 has turned towards the front supporting frame 2 and folded, the positioning devices 40 provided to the front sustention stand 4's two side bars 41 are able to select to confine in the folding detention slot 242 (see FIG. 4) of the two set bases 24.

Furthermore, downwardly turning hinged joint control device 5 (see FIGS. 5~12) provided to the first and the second supporting bars 11, 12 in connection with the upper supporting frame 1 comprises:

A joint moving member 51 which has a press button section 510 at one side, and several joint moving detention pawls 511 at the other side. Each joint moving detention pawl 511 goes through a corresponding first turning base 52, and then butts against an end surface 530 of a detention gear 53 (see FIG. 5), with its inner end 512.

The first turning base 52 has a disc shaped member 521 and a coupling nipple 522 connected with the former. The disc shaped member 521 is hinged to a second turning base 55 with a hinge member i.e. a rivet 7 (see FIG. 5), whereas the coupling nipple 522 of the first turning base 52 is used to joint with the first supporting bar 11 of the upper supporting frame 1 at its one end (see FIG. 2). Several via holes 5211 are provided to the disc shaped member 521 so as to allow those joint moving detention pawls 511 of the joint moving member 51 to pass through. A center shaft 5212 (see FIG. 6) is provided to the other side of the disc shaped member 521 together with several tooth slots 5213 (see FIG. 6) which can be in mesh with one side of several gear teeth 531 formed on the detention gear 53.

Figure 5:
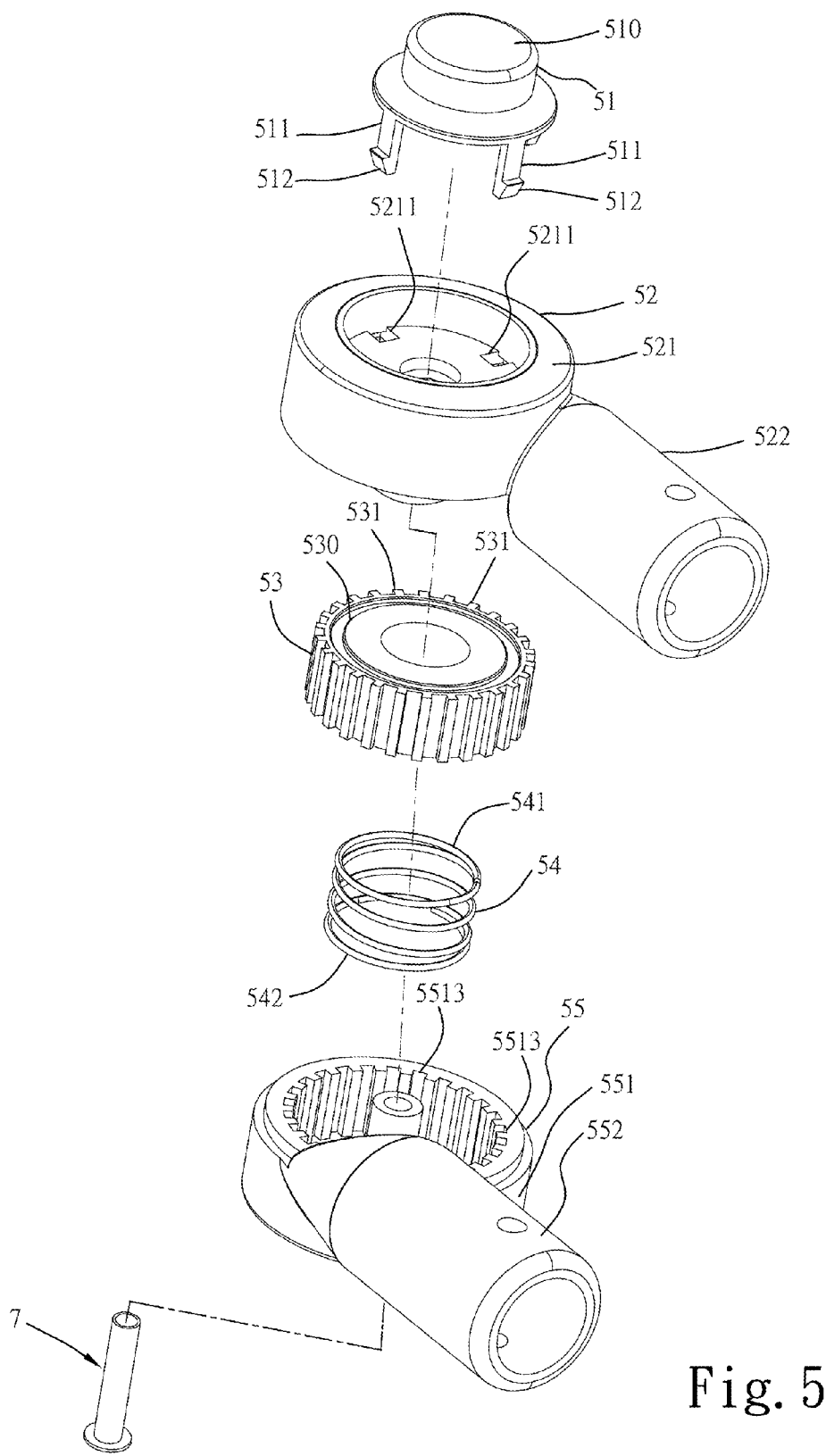
FIG. 5 is a three dimensional exploded view of the downwardly turning hinged joint control device according to an embodiment of the present invention.
Figure 6:
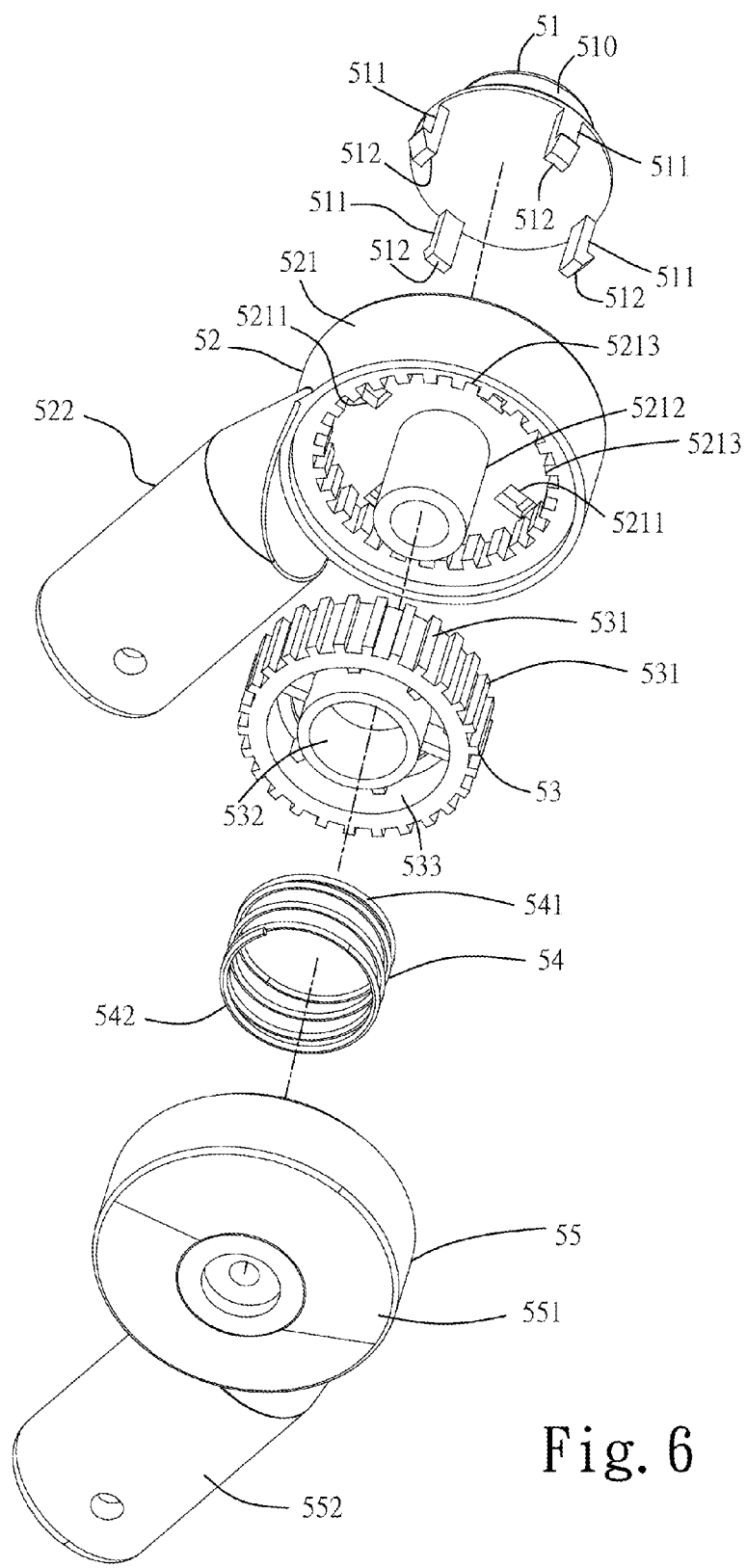
FIG. 6 is a similar view as that of FIG. 5 observed from another angle.
Figure 7:
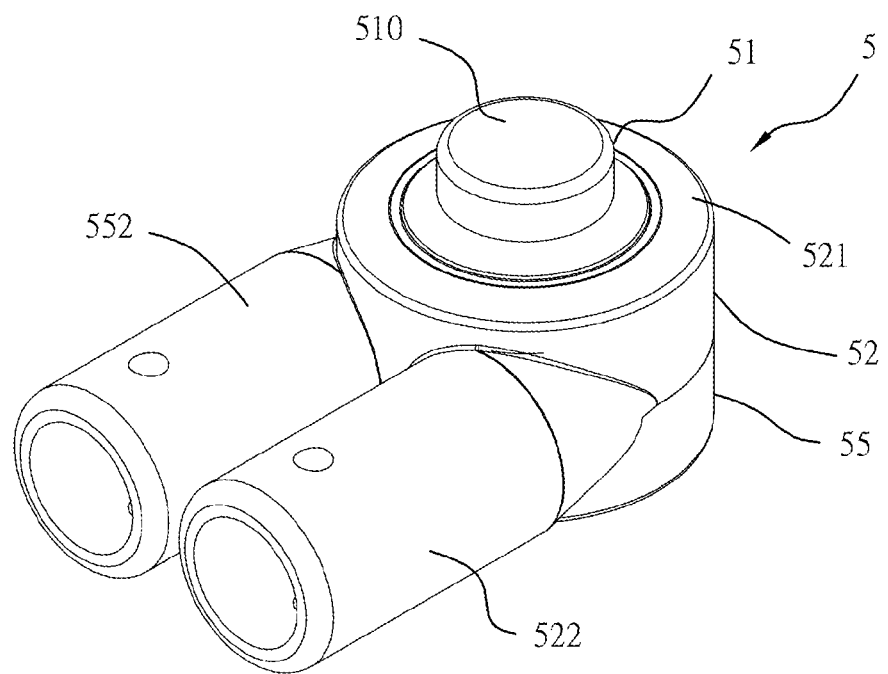
FIG. 7 is a three dimensional view of the downwardly turning hinged joint control device in the folded state according to an embodiment of the present invention.
Figure 8:
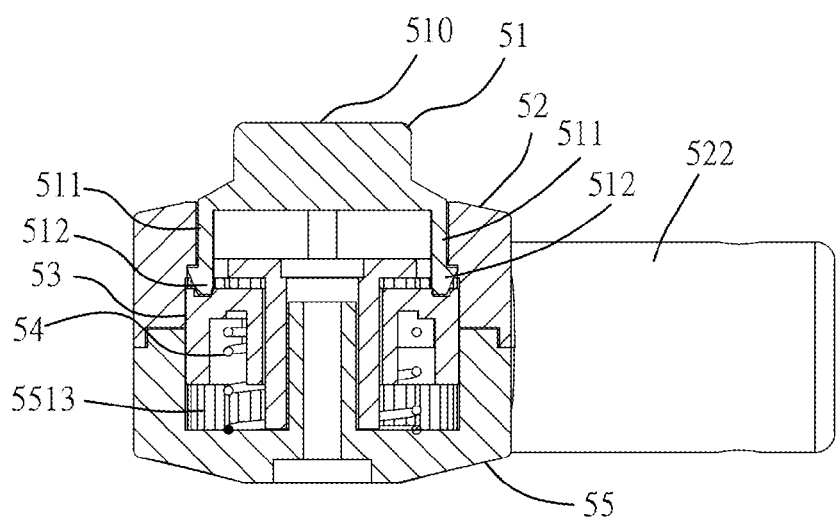
FIG. 8 is a sectional schematic view of the assembled downwardly turning hinged joint control device in folded state according to an embodiment of the present invention.
Figure 9:
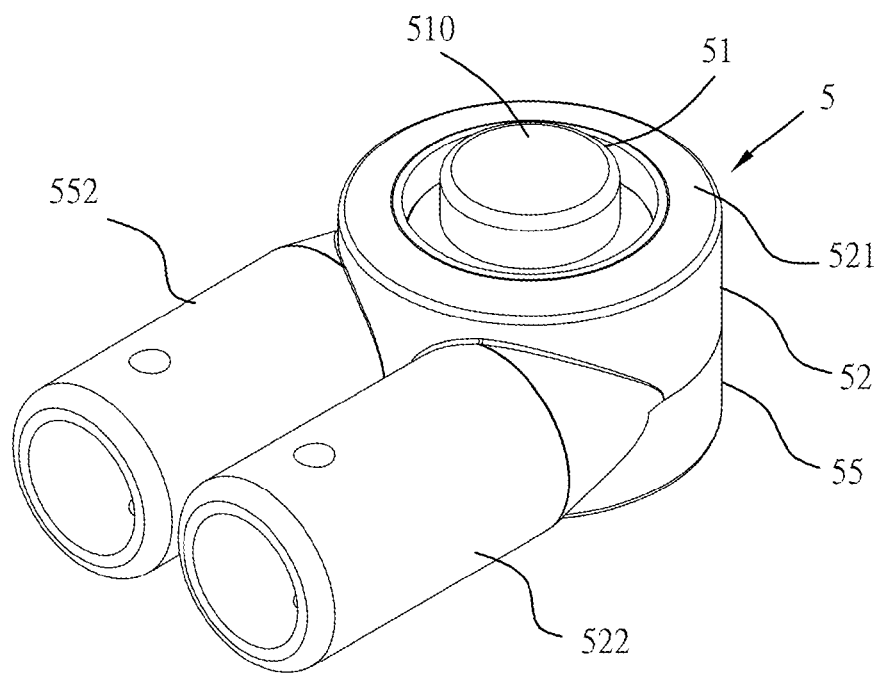
FIG. 9 is a three dimensional schematic view according to an embodiment of the present invention showing the joint moving member of the downwardly turning hinged joint control device is pressed.
Figure 10:
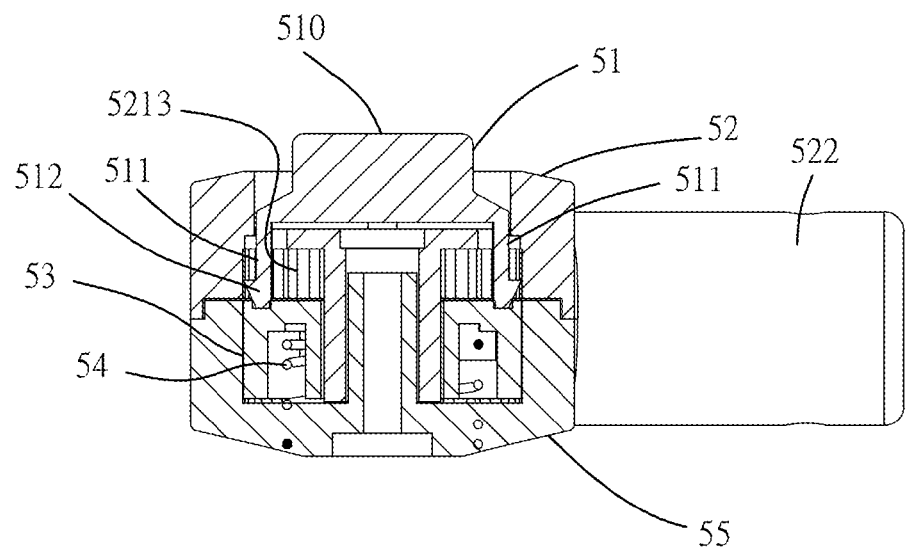
FIG. 10 is a sectional schematic view of the downwardly turning hinged joint control device unit where its joint moving member has been pressed according to an embodiment of the present invention.
Figure 11:
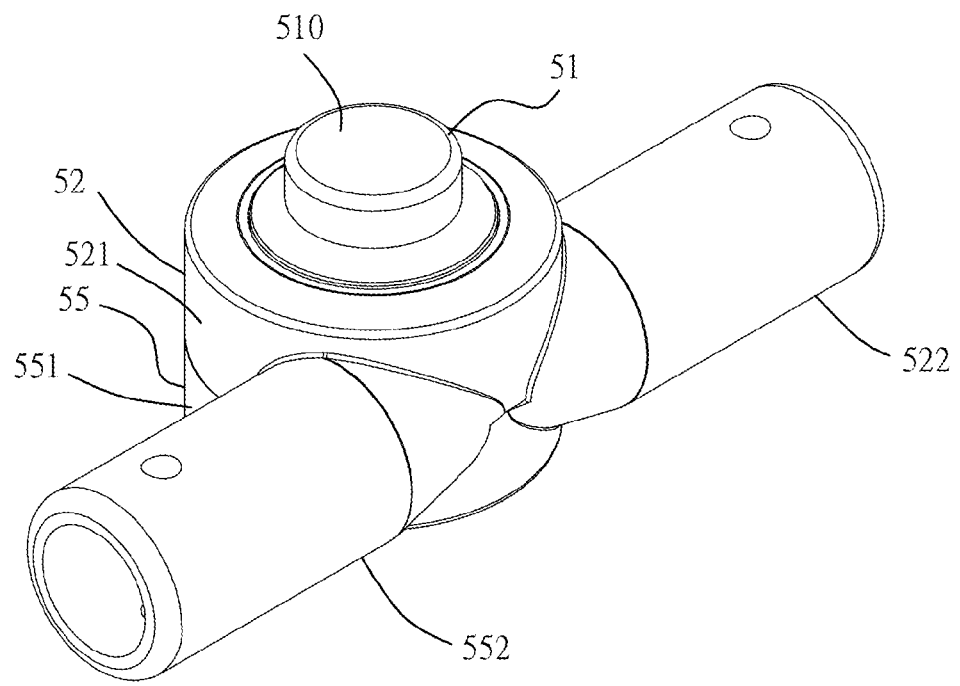
FIG. 11 is a three dimensional view according to an embodiment of the present invention where the downwardly turning hinged joint control device is in developed state.
Figure 12:
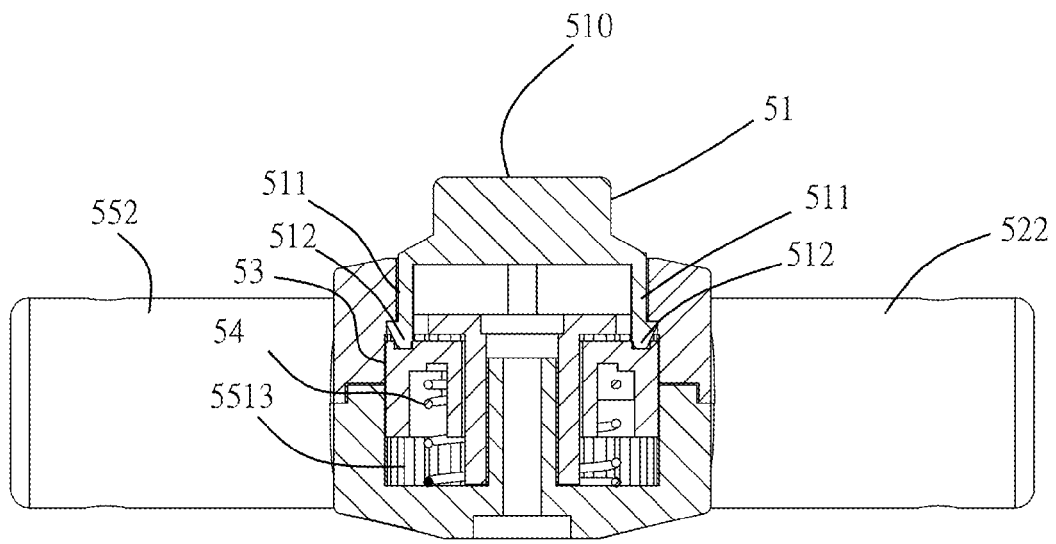
FIG. 12 is an unit sectional schematic view of the downwardly turning hinged joint control device in developed state according to an embodiment of the present invention.

The detention gear 53 has several gear teeth 531, one side of each gear tooth 531 is in mesh with its corresponding gear slot 5213 of the first turning base 52, and the other side thereof may be in mesh with a corresponding gear slot 5513 of the second turning base 55 (see FIG. 5). The detention gear 53 has a shaft bushing 532 (see FIG. 6) for the center shaft 5212 (see FIG. 6) of the first turning base 52's disc shaped member 521 to be hinged. An annular recess 533 is formed at the other side of the detention gear 53 for accepting one end of a second spring 54 to stretch into and butt against the inner wall of the annular recess 533.

The second spring 54 butts against the inner wall of the detention gear 53's annular recess 533 with its one side 541 (see FIG. 6), and against the disc shaped member 551 of the second turning base 55 with the other side 542.

The second turning base 55 has a disc shaped member 551 and a coupling nipple 552 connected with the former. The coupling nipple 552 is used for connecting with one end of the upper supporting frame 1's second supporting bar 12 (see FIG. 2), while the disc shaped member 551 is provided with several tooth slots 5513 (see FIG. 5) to allow the other end of the detention gear 53 to mate with.

With the downwardly turning hinged joint control device 5 constructed as such, and since both sides of detention gear 53's gear teeth 531 are respectively in mesh with the tooth slots 5213, 5513 of the first and the second turning bases 52, 55's disc shaped members 521, 551, the first and the second turning bases 52, 55 cannot turn (refer further to FIG. 7, 8, 11, 12). When the joint moving member 51 is pressed (see FIGS. 9~10), joint moving pawls 511 butt against the detention gear 53 thereby compressing the second spring 54 with the detention gear 53 and the detention gear 53 separates from the disc shaped member 521 of the first turning base 52 and meshes with the disc shaped member 551 of the second turning base 55. As a result, both first and second turning bases 52, 55 are able to develop or fold by turning about the hinged joint.

With this blind supporting framework structure, a camouflaged cloth covered structure (not shown) can be built up by way of machine sewing, or binder hook bound. When in use, both upper supporting frames 1 can be conveniently turned about the hinged joint to separate each other for beginning duck hunting.

In short, it emerges from the description of the above embodiment that the invention has several noteworthy advantages, in particular:

1. Folding or developing operation is simple convenient and rapid. When folding, the only thing to do is to press the joint moving member 51 of the downwardly turning hinged joint control device 5 so as to fold the first and the second supporting bars 11, 12 of the two upper supporting frames 1 by turning both bars about their hinged joints (see FIG. 3), and at the same time fold the rear supporting frames 2, 3 by joint moving. Afterwards, shift the positioning device 40 so as to release it from one of the positioning slots 241 of the set base 24 such that the front sustention stand 4 can fold in the direction of the front supporting frame 2 (see FIG. 4) thereby completing the folding operation. The operation is easy. When intending to develop for use, the only thing to do is to shift the positioning device 40 so as to release it from the folding detention slot 242 such that the front sustention stand 4 can turn outwards about the hinged joint to develop. After that bring the positioning device 40 into another positioning slot 241 of the set base 24 and detained there, then press the joint moving member 51 of the downwardly turning hinged joint control device 5 to develop the first and the second supporting frames 11, 12 of both upper supporting frame 1 by turning about the hinged joint, at the same time bring the front and the rear supporting frames 2, 3. To make a joint turning about the hinged joint thereby completing the developing operation (see FIG. 2). The operation is simple without using any hand tools or detaching ay parts, it is very convenient to use.

2. The size of the folded structure is so compact to carry or change the hunting sites. Moreover, it is easy to put away or store. For the manufacturer, the cost of materials, packaging and transportation may be advantageously curtailed.

What is claimed is:

1. An easy fold layout hunting blind framework structure comprising:

two upper supporting frames each further including first supporting bars and second supporting bars, wherein each of said first supporting bars is connected to a front side bar portion, while each of said second supporting bars is connected to a rear side bar portion, each of said first supporting bars and each of said second supporting bars are in connection with each other via a downwardly turning hinged joint control device so as to control said upper supporting frame to develop or fold by turning upwards or downwards respectively about the hinged joint control device, an outer end of said front side bar portion of each first supporting bar is hinged to right and left sides respectively of a front supporting frame, and an outer end of said rear side bar portion of each said second supporting bar is respectively hinged to right and left sides of a rear supporting frame;

the front supporting frame having two side bars, each respectively connected to an opposing side of an upper bar and to a respective one of two bottom bars, wherein a first hinged casing is provided at both right and left sides of said front supporting frame's upper bar so as to be hinged to the outer ends of said front side bar portion of each first supporting bar of said two upper supporting frames via a first shaft hinge, a set base is respectively provided at an upper part of both side bars of said front supporting frame so as to make a hinge connection with a front sustention stand, said bottom bars provided at two sides of said front supporting frame are able to stand on the ground;

the rear supporting frame having two side bars, each respectively connected to an opposing side of an upper bar and to a respective one of two bottom bars, wherein a second hinged casing is provided at both right and left sides of said rear supporting frame's upper bar so as to be hinged to the outer ends of said rear side bar portion of each second supporting bar of said two upper supporting frames via a second shaft hinge, said bottom bars provided at two sides of said rear supporting frame are able to stand on the ground, and hinge inner ends with inner ends of said bottom bars provided at two sides of said front supporting frame together with a third shaft hinge;

said front sustention stand including two side bars and two bottom bars which are connected to lower parts of said two side bars, wherein upper parts of said front sustention stand's two side bars are respectively hinged to the set bases provided to two sides of said front supporting frame via a fourth shaft hinge, and at the upper parts of said two side bars are respectively provided positioning devices so as to be separably in connection with said two set bases located at two sides of said front supporting frame, said bottom bars of said rear sustention stand are used to stand on the ground.

2. An easy hold layout hunting blind framework structure of claim 1, wherein the upper part of each of said front sustention stand's two side bars is formed into a hollow tube portion and there are a first spring and a corresponding slide slot for settling said positioning device, said hollow tube portion further has a set member such that one end of said first spring butts against said set member, and the other end thereof butts against a middle portion of said positioning device, two opposing ends of said positioning device respectively go through said slide slot to allow said positioning device to compress said first spring and slide up and down in said slide slot, the set bases which are respectively provided on said front supporting frame's two side bars respectively have several positioning slots disposed in different angles such that said positioning devices provided at two side bars of said front sustention stand are free to select any one of said positioning slots between the two set bases provided to said front supporting frame to detain the opposing ends of the positioning device.

3. An easy fold layout hunting blind framework structure of claim 2, wherein said two set bases of said front supporting frame further have a folding detention slot such that said positioning devices provided on said front sustention stand's two side bars are selectable to be confined in said folding detention slot of said two set bases.

4. An easy fold layout hunting blind framework structure of claim 1, wherein each said downwardly turning hinged joint control device provided to said first and said second supporting bars in connection with said upper supporting frame comprises:

a joint moving member which has a press button section at one side, and several joint moving detention pawls at the other side, each joint moving detention pawl goes through a corresponding first turning base, and then butts against an end surface of a detention gear;

said first turning base has a disc shaped member and coupling nipple connected with the disc shaped member, said disc shaped member is hinged to a second turning base with a hinge member, wherein said coupling nipple of said first turning base is used to joint with said first supporting bar of said upper supporting frame, several via holes are provided on said disc shaped member so as to allow the joint moving detention pawls of said joint moving member to pass through, a center shaft is provided to the other side of said disc shaped member together with several tooth slots;

said detention gear has several gear teeth, one side of each gear tooth is meshable with a corresponding tooth slot of said first turning base, said detention gear has a shaft bushing for said center shaft of said first turning base's disc shaped member to be hinged, an annular recess is formed at the other side of said detention gear for accepting one end of a second spring to stretch into and butt against the inner wall of said annular recess;

said second spring butts against the inner wall of said detention gear's annular recess with one side, and against said disc shaped member of said second turning base with an opposite side;

said second turning base has a disc shaped member and a coupling nipple connected with the former, said coupling nipple is used for connecting with one end of said upper supporting frame's second supporting bar, while said disc shaped member is provided with several tooth slots to allow an opposite side of each gear tooth of the detention gear to mate with.

* * * * *